Sept. 19, 1961 A. U. BRYANT 3,000,609
VALVE CONSTRUCTION
Filed July 11, 1958 4 Sheets-Sheet 2
FIG_2_
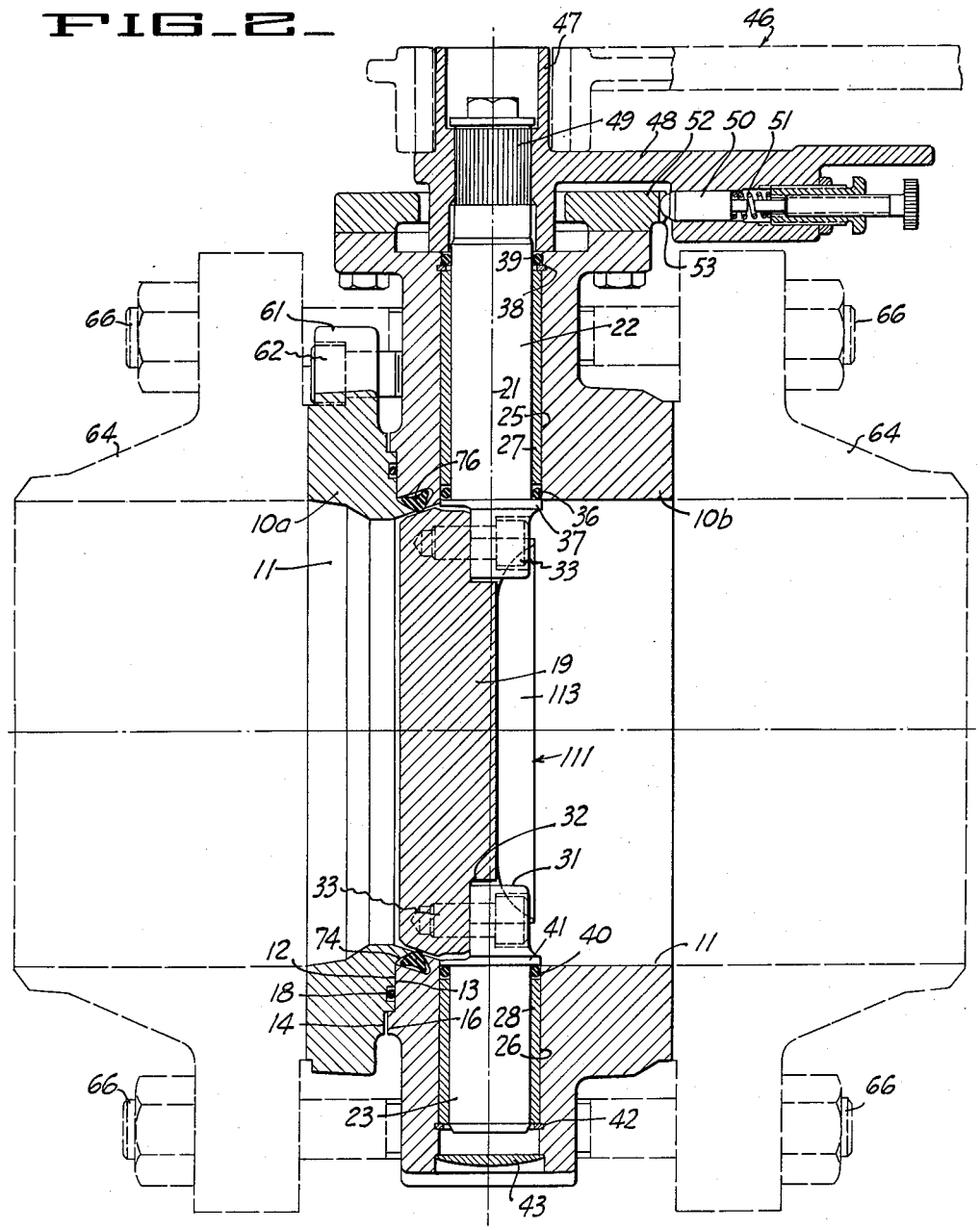
INVENTOR.
Austin U. Bryant
BY
ATTORNEYS Sept. 19, 1961     A. U. BRYANT     3,000,609
VALVE CONSTRUCTION
Filed July 11, 1958     4 Sheets-Sheet 3
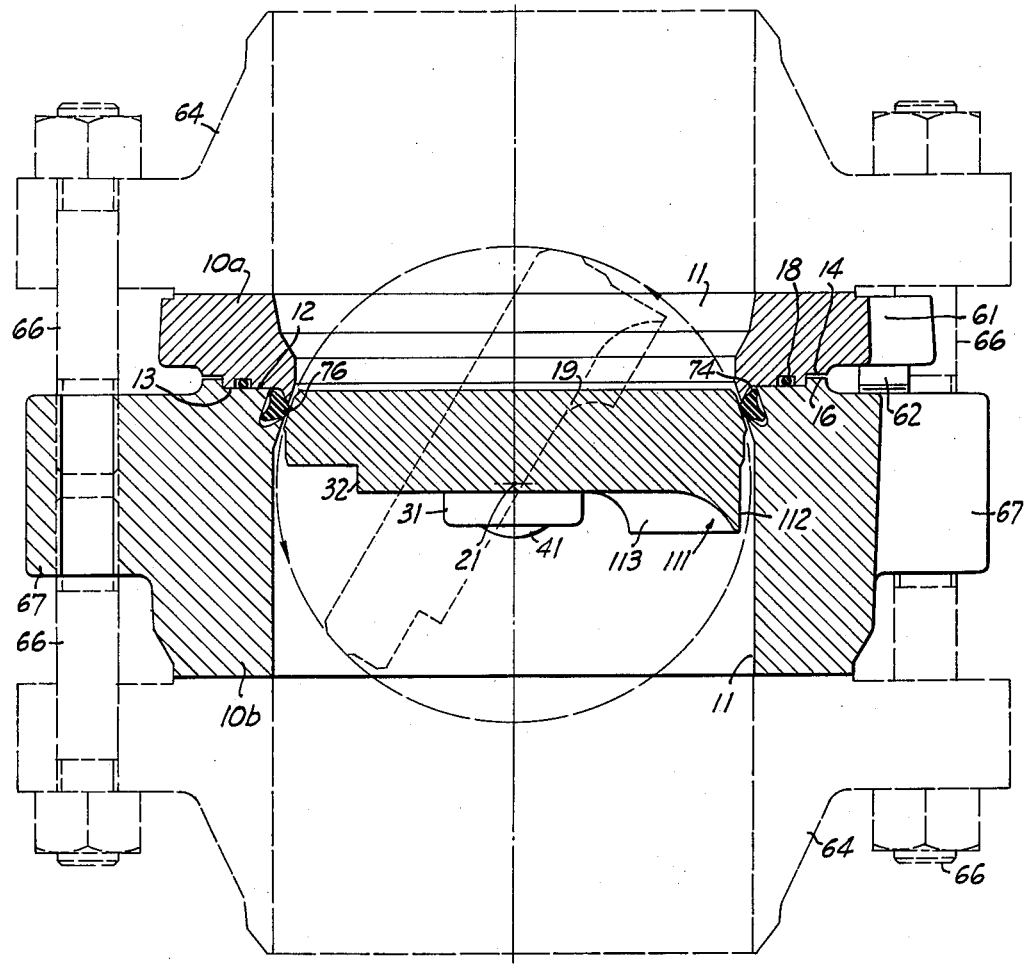
FIG_3_
FIG_4_
FIG_7_
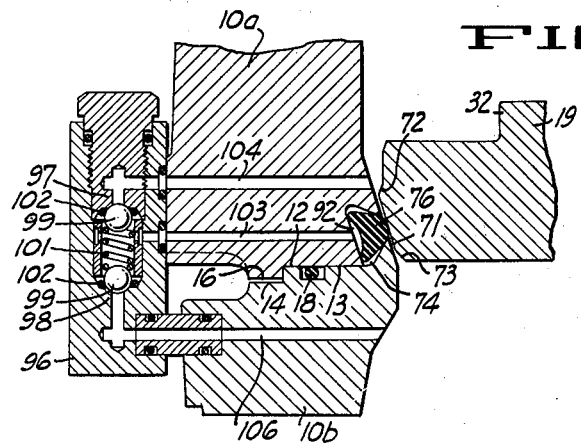
INVENTOR.
Austin U. Bryant
BY
*Flehr & Swain*
ATTORNEYS

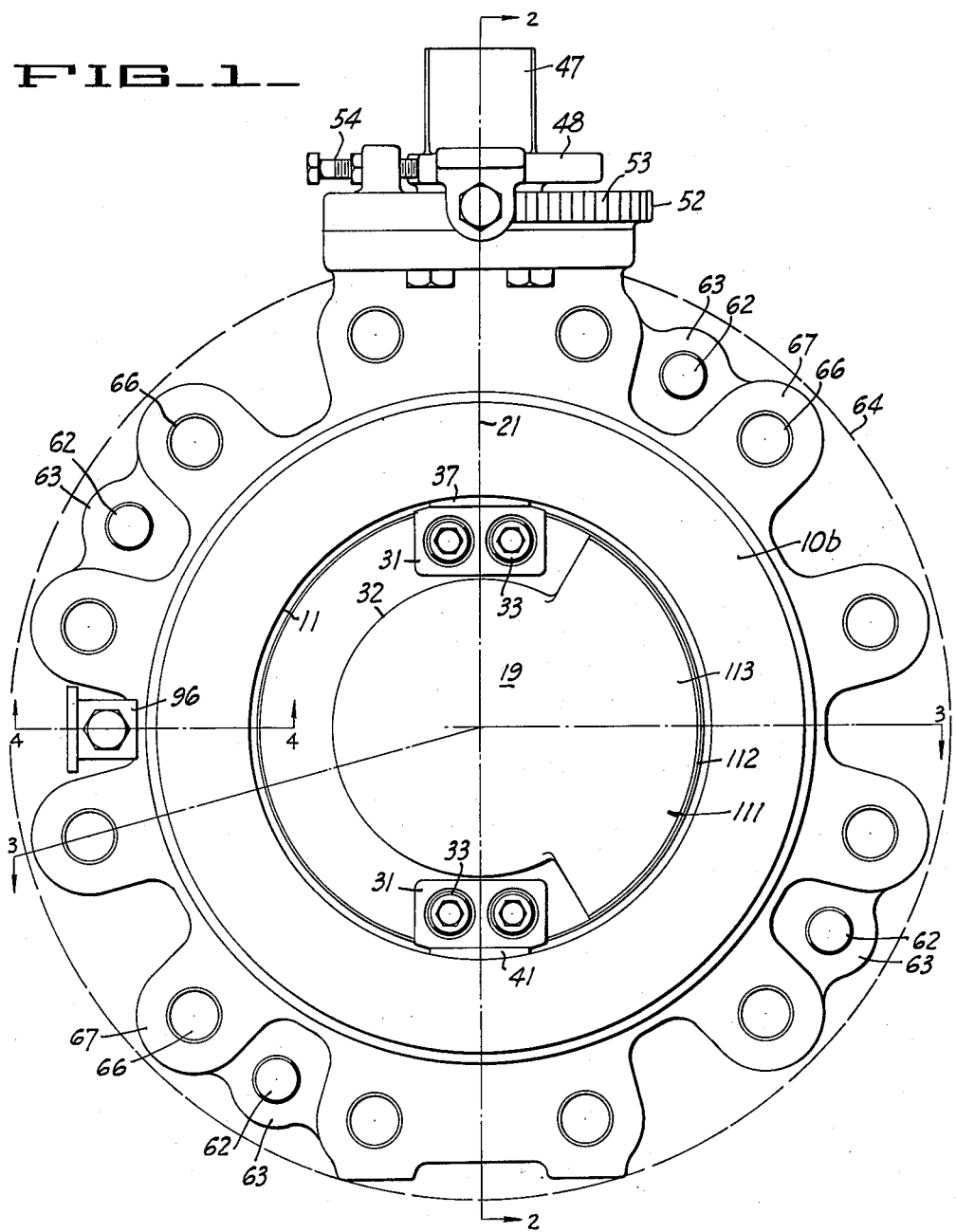

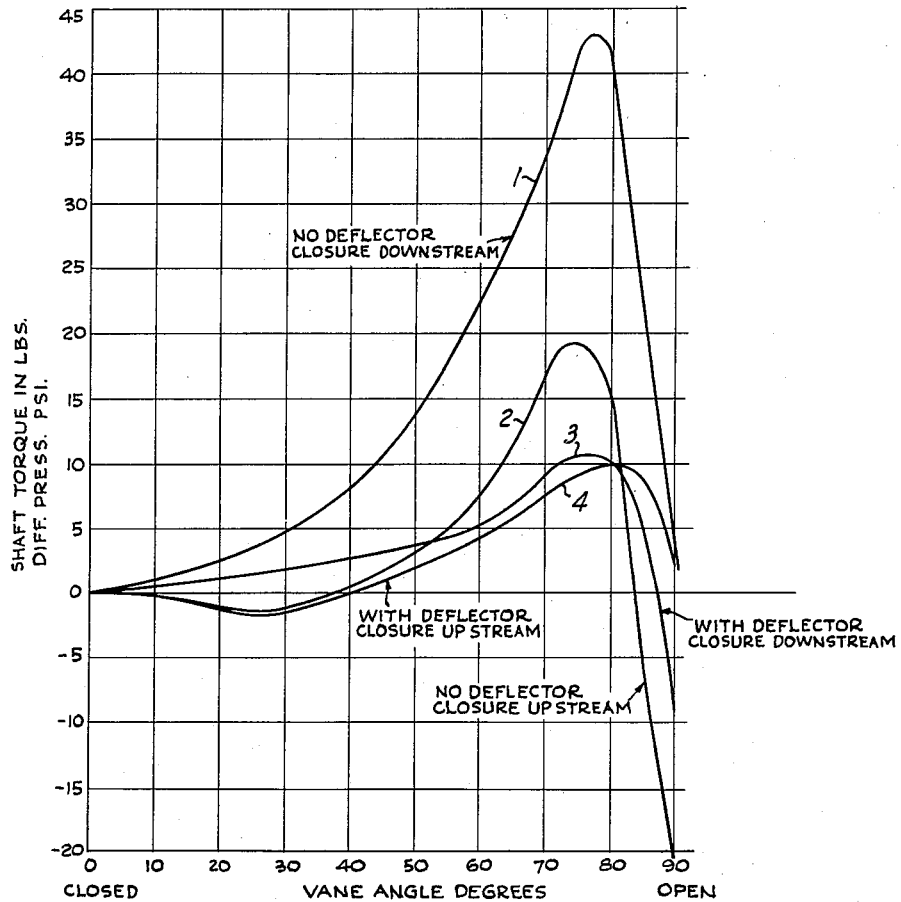
FIG_6_
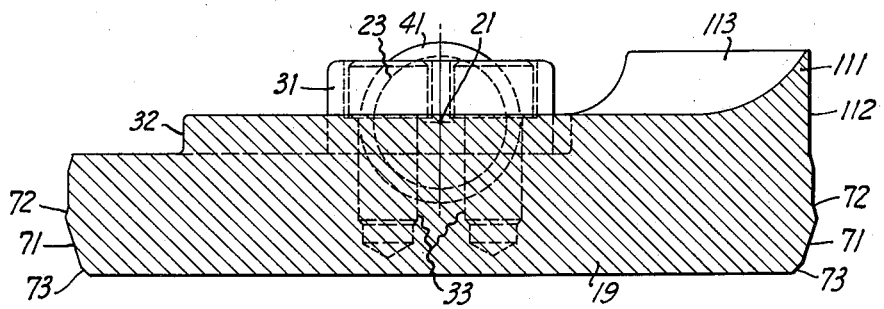
FIG_5_
INVENTOR.
Austin U. Bryant
BY
Flehr & Swain
ATTORNEYS

United States Patent Office 3,000,609
Patented Sept. 19, 1961

3,000,609
VALVE CONSTRUCTION
Austin U. Bryant, Walnut Creek, Calif., assignor to Grove Valve and Regulator Company, Oakland, Calif., a corporation of California
Filed July 11, 1958, Ser. No. 748,000
1 Claim. (Cl. 251—306)

This invention relates generally to valves of the so-called "butterfly type."

Conventional valves of the butterfly type employ a body having a flow passage, together with a disc-like valve member mounted by shaft means to turn between full open and closed positions. In closed position the valve member extends substantially at right angles to the axis of the passage, and in full open position it extends generally parallel to such axis. The axis of rotation provided by the shaft means may be diametrical and parallel to the plane of the disc, or it may be inclined at an acute angle with respect to the disc, in which the shaft axis is disposed at a corresponding angle to the axis of the passage. Irrespective of the precise way in which the valve member is mounted for turning between full open and closed positions, for partially open and full open positions, flow occurs past both the side faces of the valve member, with diametrically opposite portions of the valve member forming leading and trailing edges.

It has been found that butterfly valves are generally balanced for closed position, because the two halves of the valve member present substantially equal pressure areas on the two sides of the turning axis. For full open position, and assuming that the turning axis passes through the center of the valve, any differential fluid pressure between the upstream and downstream sides of the body does not tend to create forces acting to rotate the valve member. Should the turning axis offset from the center of the valve member there may be some remitting unbalance for full open position.

For certain intermediate positions of the valve member between full open and closed positions, the valve is unbalanced under flow conditions and relatively high torques may be developed tending to rotate the valve member toward closed position. For example, assuming that the valve member is set in a position 10° off of full open position, or in other words 80° from full closed position, and the valve applied in a fluid system in which a high flow velocity occurs through the passage, a torque is developed tending to urge the valve member toward closed position. Where the fluid pressure on the upstream side is relatively high, the torque may be relatively high, and is a limiting factor to a practical commercial design. For example, assuming that the valve is to be designed for working pressures of the order of 300 to 600 p.s.i., with a flow passage of the order of 12 inches in diameter, the torque developed (with the pressure differential and flow rate that may be attained in a typical installation having entrance and exit lines) may be of the order of from 5,000 to 10,000 foot pounds. Such torques necessitate relatively heavy shafts and operating gears. Because of the foregoing, relatively few butterfly valves have been manufactured for operating pressures in excess of about 300 p.s.i., and in many instances it is customary to supply the valves subject to maximum specified flow rates.

In general, it is an object of the present invention to provide a butterfly valve which overcomes the limitations of prior valves of this character, and which in particular avoids undue torques for the higher operating pressures.

Another object of the invention is to provide a butterfly valve construction suitable for relatively high operating pressures, which is relatively simple in its construction.

Additional objects and features of the invention will appear from the following description in which the preferred embodiment has been set forth in detail in conjunction with the accompanying drawing.

Referring to the drawing:

FIGURE 1 is an end view of a butterfly valve incorporating the present invention.

FIGURE 2 is a cross sectional detail taken along the line 2—2 of FIGURE 1.

FIGURE 3 is a cross sectional detail taken along the line 3—3 of FIGURE 1.

FIGURE 4 is an enlarged cross sectional detail along the line 4—4 of FIGURE 1.

FIGURE 5 is a detail in section illustrating the construction of the valve member including the flow deflecting means.

FIGURE 6 is a graph illustrating various typical torque curves.

FIGURE 7 is an enlarged view in section illustrating the seal ring and its mounting.

The valve construction illustrated in FIGURES 1–3 consists of a body formed of two parts 10a—10b. The flow passages 11 formed by these parts are adapted to be connected with associated piping. The adjacent portions of the two body parts are machined to provide the annular mating faces 12 and 13, together with the offset annular faces 14 and 16. An annular groove or recess is provided in body part 10a and serves to accommodate the resilient seal ring 18, which serves to form a fluid tight seal between the two parts.

The valve member 19 is in the form of a disc mounted for rotation about the axis 21. The outer peripheral surface of this valve member forms a valve working surface adapted to contact resilient seal means carried by the body. Opposite edge portions of the valve member 19 are attached to the inner ends of the aligned shafts 22 and 23. These shafts are accommodated within the bores 25 and 26, formed in the body part 10b, and are journaled within the bushings 27 and 28. A flattened lug 31 is formed on the inner end of each shaft, and is adapted to be seated within recess 32 formed in the adjacent margin of the valve member. Screws 33 serve to fix each lug to the valve member, the tolerances being such that the parts may be accurately aligned before the screws are tightened.

Suitable sealing means is provided to prevent leakage about each of the shafts. As illustrated resilient O-ring 36 is located adjacent the inner end of the bushing 27, and is retained by an annular collar 37 formed on the corresponding end of the shaft. The outer end of the bushing engages the snap-in ring 38. Another O-ring 39 provides protection against entrance of foreign material and serves to retain lubricant. Shaft 23 is shown similarly provided with a pressure seal ring 40 retained by the flange or collar 41. The outer end of the bushing 28 engages the snap-in ring 42. The outer end of bore 26 may be provided with the closure disc 43.

Shaft 22 has its outer end adapted for connection with suitable operating means, such as the handle 46. This handle is fitted upon the square head 47 of the arm 48. The head 47 in turn engages the fluted end 49 of the shaft 22. Arm 48 carries a detent member 50 that is urged by spring 51 against the quadrant 52. Indentations 53 in the quadrant serve to retain the operating means in full open and closed positions. Adjustable stop screws 54 (FIGURE 1) can be provided for limiting turning of the valve member at the full open and closed positions.

Suitable means are provided for clamping the two parts of the body together. Thus, the circumferentially spaced ears 61 on body part 10a are engaged by screws 62 that are threaded into the ears 63 (FIGURE 1) on the body part 10b.

FIGURES 1 and 2 illustrate the valve installed between the coupling flanges 64 of associated piping. Clamping studs 66 are threaded into the ears 67 on the body part 10b, and serve to clamp the two parts of the body between the flanges 64.

Various types of sealing means can be employed between the valve member and the body. For example, I can employ sealing means of the O-ring type, or other types of sealing arrangements making use of suitable resilient material, such as synthetic rubber, Teflon, Kel-F, nylon, or the like. The particular means illustrated is disclosed and claimed in copending application Serial No. 680,249, filed August 26, 1957, now Patent No. 2,965,354, and entitled "Valve Construction." Thus the periphery of the valve member is machined to provide the valve working surface 71. This surface conforms to a truncated cone that is tangential to a sphere having its center coincident with the axis 21 and the axis of passage 11, and having a radius corresponding to the distance from such center to the medial portion of the surface 71. Bevelled surfaces 72 and 73 are formed adjacent the edges of the surface 71, and as viewed in section (FIGURES 5) these bevelled surfaces extend at an angle of about 30° with respect to the valve working surface 71.

In that portion of the body which surrounds the valve member 19, an annular recess 74 is provided to accommodate the resilient seal ring 76. This seal ring is formed of a suitable elastomer, such as resilient synthetic rubber, Kel-F, Teflon or nylon. It may have a hardness on the durometer scale of the order of 90 or more. The configuration of the seal ring in section (FIGURE 7) is generally triangular. It has relatively flat side surfaces 77, and a base surface 78 which is concave as illustrated. The surface 79 forming the apex is rounded and is adapted to press against and make sealing contact with the valve working surface 71 of the valve member. The surfaces 81 on the base corners of the seal ring are likewise rounded, and merge with the side surfaces 77 and the base surface 78. The base portions 82 of the ring form legs capable of both bending and compression, thus in effect increasing the give afforded for a resilient material of a given hardness. The extremities of the leg portions 82 are coincident with the surface of a cone having its axis coincident with the central axis of the valve member, when the later is in closed position.

The recess 74 within which the seal ring is accommodated is likewise contoured to be generally triangular in section. The sides of this recess are defined by lips 83 and 84, formed on the body parts 10a and 10b respectively. The side recess surfaces 86 are formed on the inner faces of the lips 83 and 84. The gap between the lips 83 and 84 is such that these lips normally compress the ring to a limited extent in two opposed regions, for the relaxed condition of the ring (i.e., when differential pressure is not being applied). Thus each lip has sealing contact with the ring for such relaxed condition, and has such engagement with the seal ring as to provide substantial mechanical retention. The bottom surface 87 of the recess conforms generally to the surface of a cone having its axis coincident with the axis of the valve member when in closed position, and this surface is in sealing contact with both of the rounded surfaces 81, for relaxed condition of the seal ring. The corners of the recess are defined by the rounded surfaces 88, which are formed to a radius slightly greater than the radius to which the surfaces 81 are formed.

The dimensioning is such that spaces 89 are present between the surfaces 77 and 86, and also between the surfaces 78 and 87, for relaxed condition. The spaces 89 preferably are in pressure transmitting communication with the corresponding flow passages of the valve. Thus one or more small ducts 90 establish such communication for one side of the recess, and one or more similar ducts 91 establish such communication for the other side. Such communication is not essential but aids in securing the desired application of fluid pressure to the seal ring.

As will be presently explained, the space 92 between the surfaces 78 and 87 is placed in pressure transmitting communication with the upstream (i.e. high pressure) side of the valve through an arrangement of check valves.

As shown in FIGURE 7, the rounded surface 79 of the seal ring 78 normally protrudes a small amount from the lips 83 and 84. The peripheral surfaces 93 and 94 of these lips conform to the surface of a cone, and they are dimensioned to have a small clearance with respect to the valve working surface 71 of the valve member. For closed position of the valve member, the rounded surface 79 of the seal ring presses against the valve surface 71, with some compression of the ring, to thereby establish fluid tight contact with the valve member, and in addition serving to press the leg portions 82 of the ring in a direction to urge the rounded surfaces 81 into fluid tight relation with the adjacent surfaces of the recess.

FIGURE 4 shows a suitable arrangement of check valves for establishing communication between the space 92 at the base of the seal ring, and the upstream side of the valve. Thus a small valve body 92 is clamped against one side of the main body by suitable means such as screws (not shown). A pair of valve seats 97 and 98 are formed within this body 96, and are engaged by the valve balls 99. A spring 101 urges both balls against their seats. Sealing means such as the resilient O-rings 102, are disposed adjacent each valve ball, to provide an effective seal for closed positions of the same. Duct 103 connects between the space 92 and the space between the balls 99. Duct 104 establishes communication between one side of the valve member, and the valve seat 97. Duct 106 establishes communication between the other side of the valve member and the seat 98. With this arrangement either one of the two passages 11 may connect to the upstream or high pressure side of the system with which the valve is employed. Assuming that the upstream side is that side with which the duct 104 communicates, then seat 97 permits application of such fluid pressure through the duct 103, to the space 92. Likewise if duct 106 should connect to the upstream side, then the upstream pressure will be applied to this duct, and through seat 98 and duct 103, to the space 92. However, fluid cannot bypass directly between the ducts 104 and 106.

Operation of the sealing means described above is as follows: When the valve member is in closed position, its valve working service 71 is in sealing contact with the rounded surface 79 of the seal ring 76. The stressing of the seal ring under such conditions establishes an initial fluid tight seal. Assuming now that a fluid pressure is applied to either one or the other side of the valve, the seal ring is displaced by the pressure differential and is pressed against one or the other of the surfaces 86. The space 92 at the base of the seal ring is in communication with the high pressure or upstream side. Application of the upstream pressure in this manner serves to urge the seal ring against the valve surface 71. When applied pressure differential is reduced from a substantial value, fluid pressure that may be trapped in space 92 is permitted to vent out to the upstream side.

As previously mentioned, a simple butterfly valve member having substantially flat sides is subject to certain torque characteristics under high flow conditions. Curve 1 of FIGURE 6 illustrates the torque characteristics for a valve of the type described above, assuming the use of a simple flat valve member, with pressure differential being applied to the right hand side of the valve as illustrated in FIGURE 2. Curve 2 is a torque curve of the same valve under the same operating conditions, but with the high pressure being applied to the left hand side of the valve. These curves are plotted against the ratio between shaft torque (in inch pounds), and the differential pressure in pounds per square inch (on the vertical axis), and the angular positioning of the valve member (on the horizontal axis). It will be noted that the shaft torque represented by curve 1 rapidly rises to a peak at about 78° shaft position, and then falls off rapidly toward full open position. At the full open position there is some torque tending to move the valve member toward closed position. The torque represented by curve 2 becomes slightly negative (i.e. a reverse torque) between about 10° to 40°, and then rises rapidly to a peak at about 74°. Thereafter it falls rapidly to zero torque at about 84°, and to a minus valve for full open position. This means that for full open position there is a torque tending to hold the valve member open. Assuming manual turning of the valve member to closed position, it passes through zero torque condition at about 84°, and from this position to about 40° position, there is substantial torque tending to move the valve toward closed position. Changes in torque as represented by curves 1 and 2 occur for all operating pressures but are particularly detrimental for high operating pressures and high flow rates, where the torques reach such values as to require shafts of excessive size and strength. The high turning torques are probably due to the forces acting upon the leading edge of the valve member and are comparable to aerodynamic effects. The differences between the two curves is due to the offset of the turning axis from the outer plane of the valve member. The unbalance in full open position is attributed to the same feature.

In accordance with the present invention I provide the valve member with torque modifying means in the form of a flow deflector 111. In the particular form illustrated, the deflector is constructed integral with the body of the valve member and is in the form of a rib, which is arcuate as viewed in FIGURE 1. Its outer peripheral surface 112 conforms generally to the segment of a cylinder, and its inner surface 113 which is faced toward the axis of rotation, is preferably concave and inclined as illustrated. It will be noted that this deflector is disposed on that side of the valve member which is nearest to the axis of rotation. Thus the main body of the valve member is disposed on one side of the axis of rotation, while the deflector extends upon the other side.

Referring to FIGURE 3, it will be evident that when the valve member is in full open position, or partly open position, flow past the two sides of the valve member is deflected by either surfaces 112 or 113, depending upon the direction of flow. Curves 3 and 4 of FIGURE 6 illustrate the modified torque characteristics of a butterfly valve member constructed in the same manner as the valve represented by curves 1 and 2 except for the use of the flow deflector. Thus under given flow conditions, it will be noted that maximum torque indicated by the peak of curve 3 is about ⅓ the maximum torque represented by the peak of curve 1. Also, for full open position of the valve member, the torque is somewhat negative, which means that the valve member is retained in full open position. Curve 4, which represents flow in the opposite direction, shows a peak torque which is about ½ the peak torque of curve 2. The curves 3 and 4 are comparable, which means that the torque characteristics for flows in opposite directions are comparable.

The action of the flow deflector cannot be fully explained but is deemed to depend upon complex aerodynamic-like effects which create a turning couple tending to close the valve member from certain angles between full open and closed positions. For one direction of flow, the deflector is on the trailing edge and under such condition it develops a turning couple by dynamic reaction. This couple is opposed to a couple created presumably by aerodynamic-like effects upon the leading edge. When the flow is reversed, the deflector is on the leading edge and presents the frontal surface 112 to the flow. Because of effects that are not clearly understood, the couple that one might expect to be created by aerodynamic-like effects on the leading edge is neutralized or greatly reduced in value, whereby the net effect is to provide a modified torque curve, like the curve of FIGURE 6.

It will be evident that my invention makes for a greatly improved butterfly valve and is particularly applicable where the valve is to be used for the higher operating pressures and flow rates. Because the shaft torques are reduced to reasonable values, the design of the shafts is greatly simplified, thus avoiding use of shafts of undue size and strength. Operating gearing, including operators of the hand wheel and motor types, can likewise be simplified. The construction makes it possible to provide torque characteristics which are similar for flow in opposite directions.

I claim:

In a valve of the butterfly type, a body having a flow passage adapted for flow in either direction, a circular disc-like valve member within the body, said valve member having a valve working surface of uniform width formed on its outer periphery that conforms substantially to the segment of a sphere, annular sealing means carried by the body and adapted to contact and seal with respect to said surface, shaft means for mounting the valve member for turning movement about an axis extending generally parallel to the plane of the valve member, said axis being offset from the center plane of the valve member and said surface being coincident with the center of said sphere, turning movement of the valve member about said axis serving to move the valve member between a closed position in which it extends substantially at right angles to the axis of the passage and a full open position in which the valve member extends substantially parallel to said axis, said valve member presenting leading and trailing edges to fluid flow through the passages for full open and partially open positions of the same, and flow deflecting means mounted upon one of said edges of the valve member and serving to reduce the torque required to hold the valve member in partially open positions under high velocity flow operating positions, said means being in the form of a deflector projecting from that face of the valve member nearest to said axis and in a region near but spaced from the outer circumference of said face thereby to present deflecting surfaces to fluid flow in either direction to obtain said reduced torque upon flow in either direction.

References Cited in the file of this patent

UNITED STATES PATENTS

| | | |
|---|---|---|
| 2,081,842 | Sharp | May 25, 1937 |
| 2,095,263 | Moss | Oct. 12, 1937 |
| 2,271,390 | Dodson | Jan. 27, 1942 |
| 2,746,374 | Kraft | May 22, 1956 |

FOREIGN PATENTS

| | | |
|---|---|---|
| 420,351 | Italy | of 1947 |